April 21, 1953  J. R. COX  2,635,408
TOBACCO HARVESTER
Filed May 6, 1952  2 SHEETS—SHEET 1
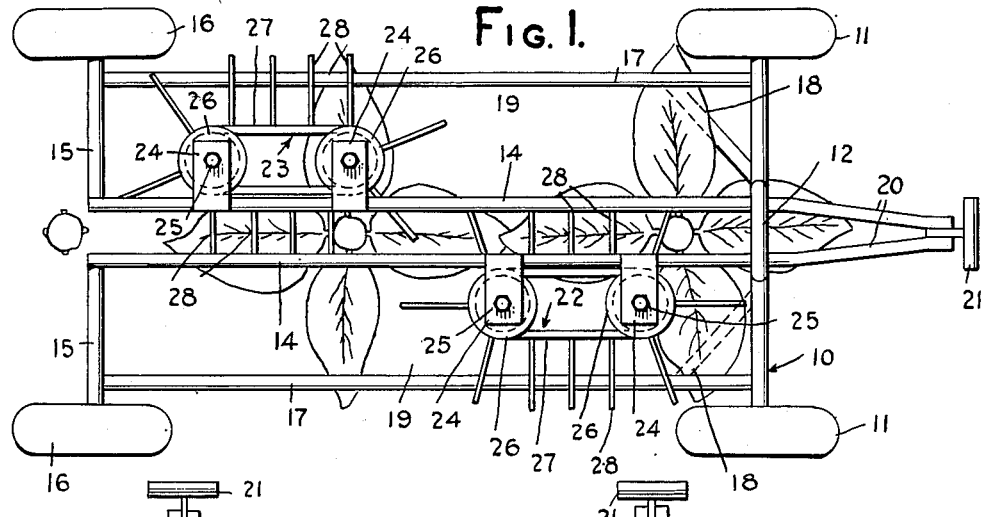
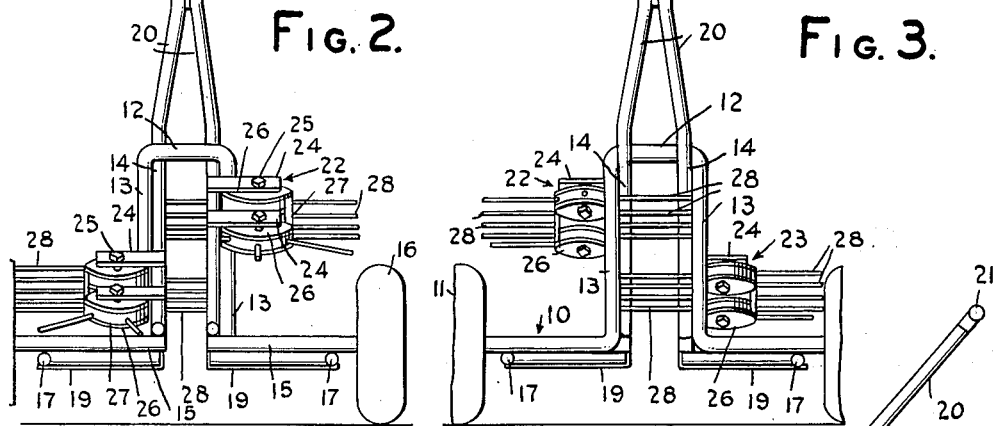
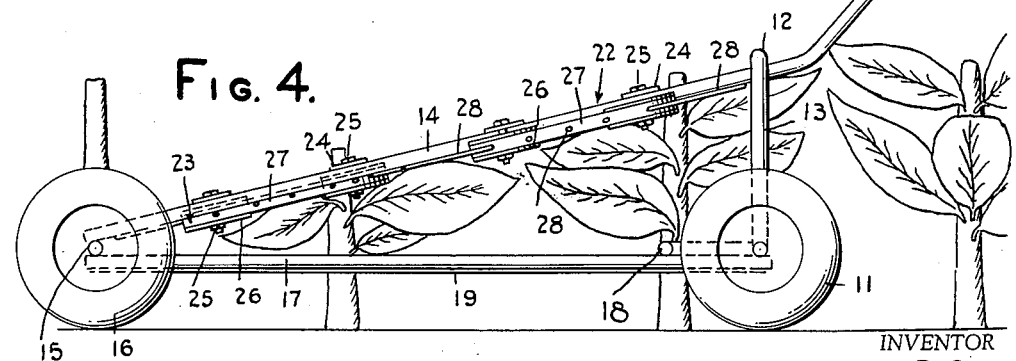
INVENTOR
JACK R. COX
BY
ATTORNEY April 21, 1953 J. R. COX 2,635,408
TOBACCO HARVESTER
Filed May 6, 1952 2 SHEETS—SHEET 2

INVENTOR
JACK R. COX
BY
ATTORNEY

Patented Apr. 21, 1953

2,635,408

UNITED STATES PATENT OFFICE 2,635,408

TOBACCO HARVESTER

Jack R. Cox, Auburn, Ala.

Application May 6, 1952, Serial No. 286,274

7 Claims. (Cl. 56—27.5)

My invention relates to a tobacco harvester.

An important object of the invention is to provide a tobacco harvester which will strip the tobacco leaves from the stem of the plant, as the harvester is drawn along a row of tobacco plants, and thereby greatly reduce the labor involved in harvesting the tobacco leaves.

A further object is to provide a harvester which may be drawn along a row of tobacco plants by a single attendant, for effectively stripping substantially all of the tobacco leaves from the plants in the row.

A further object is to provide a tobacco harvester which is highly simplified and light weight in construction, sturdy and durable, reliable and efficient in operation and economical to manufacture.

A still further object of the invention is to provide in a tobacco harvester novel and simplified means which coact for stripping substantially all of the tobacco leaves from the plants, as the operator draws the harvester along the rows of plants.

Other objects and advantages of the invention will be apparent during the course of the following description.

Figure 5:
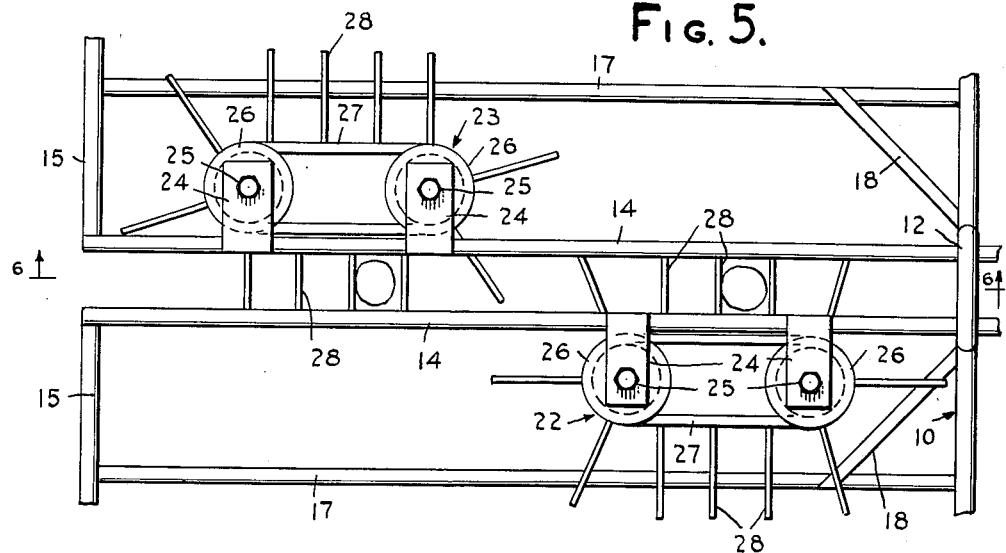
Figure 6:
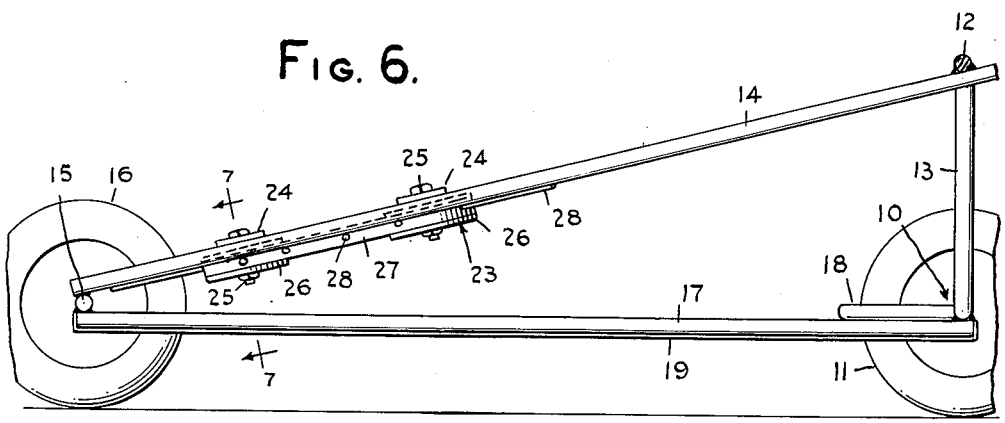
Figure 7:
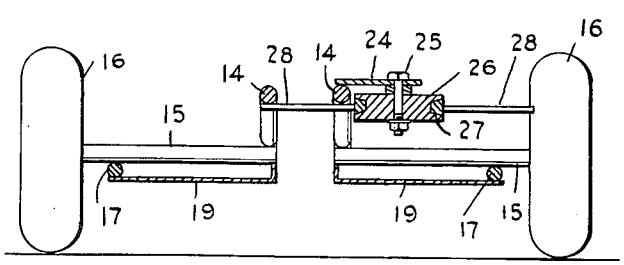

In the accompanying drawings, forming a part of this application, and in which like numerals are employed to designate like parts throughout the same, Figure 1 is a plan view of a tobacco harvester embodying my invention, Figure 2 is a fragmentary rear end elevation of the same, Figure 3 is a fragmentary front end elevation of the harvester, Figure 4 is a side elevation of the same, Figure 5 is an enlarged fragmentary plan view of the harvester, Figure 6 is a fragmentary central vertical longitudinal sectional view of the machine taken on line 6—6 of Figure 5, and, Figure 7 is a transverse generally vertical section on line 7—7 of Figure 6.

In the drawings, where for the purpose of illustration is shown a preferred embodiment of my invention, the numeral 10 designates generally a front axle for the wheeled frame or support of the harvester. The front axle 10 is equipped at its ends with wheels 11 which preferably maintain the axle elevated above the ground approximately 4 inches, although this distance may vary. The front axle 10 has an elevated central section 12, preferably spaced about 16 or 18 inches above the ground, and integrally rigidly secured to spaced vertical arms 13, in turn rigidly secured at their lower ends to the axle 10. The axle 10 is cut away between the vertical arms 13, as shown, so that a passage is formed between the arms for the reception of the growing tobacco plants when the harvester is drawn along the rows, as will be more fully described.

Inclined longitudinal parallel stripper bars 14 are provided, and these bars are preferably spaced apart approximately 2½ inches. The bars 14 are preferably approximately 36 inches long and ⅔ of an inch in diameter, and inclined upwardly toward the forward end of the harvester. The forward elevated ends of the stripper bars 14 are permanently rigidly secured by welding or the like to the elevated front axle section 12, just inside of the vertical arms 13. The rear and lowermost ends of the stripper bars 14 are permanently rigidly secured by welding or the like to rear horizontal axle sections 15, having wheels 16 mounted upon their outer ends, in longitudinal alignment with the front wheels 11. The rear ends of the stripper bars 14 are preferably held by the rear axle sections 15 approximately 4 inches above the ground, although this distance may vary slightly. The forward ends of the inclined stripper bars 14 are preferably spaced approximately 10 inches above the rear ends of the bars. The rear axle sections 15 are separate and discontinuous, and the rear ends of the stripper bars 14 are not connected, so that a continuous passage for the tobacco plants between the stripper bars is provided, Figures 1 and 5.

A pair of horizontal longitudinal brace bars 17 have their ends welded or otherwise rigidly secured to the rear axle sections 15 and front axle 10, near and inwardly of the wheels 11 and 16. The brace bars 17 are spaced a substantial distance laterally outwardly of the inclined stripper bars 14, as shown. The brace bars 17 add considerable rigidity to the wheeled support, and additional diagonal braces 18 may be provided, if desired, at the forward end of the harvester, and the diagonal braces have their forward ends welded to the front axle 10, and their rear ends welded to the brace bars 17. The front axle 10 and rear axle sections 15 are preferably disposed at the same elevation, so that the brace bars 17 will be horizontal with their rear ends arranged near the elevation of the rear ends of the stripper bars 14, as shown in Figures 4 and 6.

The harvester is further provided with a pair of elongated horizontal pans or trays 19 of sheet metal or the like, for receiving the tobacco leaves as the same are stripped from the plants by the harvester. The trays 19 have their rear ends welded or otherwise rigidly secured to the rear axle sections 15, and their front ends similarly rigidly secured to the front axle 10. The outer longitudinal edges of the horizontal trays 19 are further rigidly secured by welding or the like to the horizontal brace bars 17. The inner longitudinal edges of the trays 19 are unsupported, and are spaced apart laterally in parallel relation, directly beneath the parallel spaced stripper bars 14, Figures 2, 3 and 7.

The stripper bars 14 may be extended a short distance forwardly of the elevated axle section 12 as shown in the drawings, and upwardly inclined converging arms 20 are integrally secured to the forward ends of the stripper bars, as shown. A handle 21 is secured to the forward ends of the arms 20 and provides means for drawing the harvester along the rows of tobacco plants.

The inclined stripper bars 14 function to strip off the tobacco leaves which are growing in a direction transversely or generally transversely of the bars 14, but the stripper bars will not strip off the leaves which are arranged longitudinally or generally longitudinally of the stripper bars. Accordingly, means are provided to strip off the tobacco leaves which are growing longitudinally of the stripper bars 14, and such means comprises a pair of units 22 and 23, near the forward and rear ends of the harvester and connected with the opposite stripper bars 14.

The rear unit 23 comprises a pair of transverse rigid mounting plates 24, rigidly secured by welding to the top of one stripper bar 14 near and forwardly of the rear axle sections 15. The mounting plates 24 are spaced longitudinally on the stripper bar 14 carrying them and projecting laterally outwardly of the same. Each mounting plate 24 has a depending bolt or shaft 25 rigidly secured thereto near its outer end, and freely journaled upon each shaft 25 is a grooved pulley 26, spaced slightly outwardly of the adjacent stripper bar 14, Figure 7. The pulleys 26 are engaged by an endless flexible belt 27, the innermost run of which lies closely adjacent to the outer side of the inclined stripper bar 14, Figure 7. The belt 27 has firmly secured thereto at longitudinally equidistantly spaced points, a plurality of stripper fingers or rods 28. The rods 28 are substantially rigid, and preferably spaced apart upon the belt 27 approximately 2½ inches. The rods 28 upon the innermost run of the belt 27 extends transversely across the two stripper bars 14, and are arranged at right angles thereto, and slidably contact the bottoms of the stripper bars as best shown in Figure 7. The spacing between the pulleys 26 is such that the rods 28 of the rear unit 23 traverse approximately one half of the lengths of the stripper bars 14, Figures 1 and 5, during the operation of the harvester.

The forward unit 22 is identical with the rear unit 23, except that it is carried by the other stripper bar 14 and arranged near and rearwardly of the front axle 10. The stripper fingers or rods 28 of the forward unit 22 likewise slidably contact the bottoms of the stripper bars 14, and are adapted to extend at right angles to the stripper bars, as shown in Figures 1 and 5. The rods 28 of the forward unit 22 traverse substantially the forward half of the length of the stripper bars, as shown. The units 22 and 23 are not power driven, and are actuated only through contact with the tobacco plants, as the harvester is drawn along a row of plants, as will now be described.

In operation, the harvester is set astride a row of tobacco plants and drawn longitudinally of the row by means of the handle 21. The tobacco plants in the row enter the passage between the vertical arms 13 and pass under the elevated front axle section 12. The tops of the plants then pass between the inclined stripper bars 14, near the forward ends of these bars, and the spacing between the stripper bars 14 is just sufficient to accommodate the main stalk of the plant with a little clearance to permit the stalk to pass rearwardly between the stripper bars 14. In so traveling, the inclined stripper bars 14 progressively strip downwardly from the stalks all of the tobacco leaves which grow transversely or generally transversely of the stripper bars 14 in the manner shown in Figure 4.

Simultaneously with this operation, the stripper fingers or rods 28 of the units 22 and 23 are progressively stripping downwardly from the stalks of the plants all of the leaves which grow longitudinally or substantially longitudinally of the stripper bars 14. As each tobacco plant enters between the stripper bars 14 at their forward elevated ends, it will engage the forwardmost rod 28 of the forward unit 22 which is extending across the stripper bars 14, Figure 1. As the forward movement of the harvester continues, the stalk of the tobacco plant through its engagement with the rod 28, will turn the belt 27 of the forward unit 22 in the counter-clockwise direction, Figure 1, and the stalk will presently become enclosed between an adjacent pair of the rods 28 as it travels rearwardly between the stripper bars 14. The rods 28 which thus enclose the stalk of the tobacco plant as it moves rearwardly relative to the harvester will strip off the tobacco leaves which grow longitudinally or generally longitudinally of the stripper bars 14. The longitudinal tobacco leaves are progressively stripped downwardly from the stalks of the plants, since the transverse rods 28 travel downwardly along the inclined stripper bars 14, as shown. The tobacco leaves are engaged by both the longitudinal stripper bars 14 and transverse rods 28 close to the main stalks of the plants. This provides a clean shearing or stripping action by the stripper bars and rods; and the tobacco leaves are not engaged far enough out from the main stalks to undergo any appreciable bending; and thereby escape the stripping action of the harvester.

Since the tobacco plants in a row are generally spaced 18 or 20 inches apart, it is necessary to have the two stripping units 22 and 23 for the longitudinally growing leaves. This is true since two or more of the tobacco plants must be acted upon simultaneously by the harvester, as shown in the drawings. One tobacco plant will have passed entirely beyond the forward stripping unit 22 and into the rear unit 23, by the time that the next adjacent plant enters the harvester and engages the forward unit 22. Since the longitudinal spacing of the tobacco plants in a row will not always be equal, it is necessary to have the two stripping units 22 and 23; otherwise, two adjacent tobacco plants being acted upon simultaneously by the harvester might not properly engage the rods of a single continuous stripper unit. Since the stripper rods 28 of the two units 22 and 23 traverse substantially the full lengths of the inclined stripper bars 14, Figures 1 and 5, the harvester will effectively strip from the main stalks all of the leaves growing longitudinally of the stripper bars 14, while such bars are simultaneously stripping the leaves which grow transversely.

As the leaves are stripped from the tobacco plants, most of them will fall upon the trays 19 for collection at the end of a row or rows. In this connection, the harvester may be provided with a pair of horizontal movable conveyor belts, instead of the trays 19, for conveying the harvested leaves to the rear end of the harvester for collection.

By the time a tobacco plant passes from between the rear ends of the stripper bars 14, and out of engagement with the rearmost rod 28 of the rear unit 23, all of the tobacco leaves will have been progressively downwardly stripped from the main stalk of the plant. In this connection, the inclined stripper bars 14 and the spaced rods 28 will traverse a sufficient vertical distance, during the forward movement of the harvester, to strip all of the leaves from a tobacco plant of average height. If a few leaves should remain on any of the plants, these can, of course, be harvested by hand after the machine has completed traversing the row. In any event, the use of the harvester effects a great saving of time and labor, as compared to the usual method of harvesting tobacco by hand.

It should be mentioned that the tobacco plants, when passing through the harvester will cause the belt 27 of the rear stripping unit 23 to turn in an opposite direction from the belt of the forward unit, or clockwise, Figure 1. However, the stripping action of the rear unit 23 is identical with that of the forward unit 22.

It should also be directed to the arrangement whereby the stripper rods 28 slidably engage the bottoms of the stripper bars 14. When the tobacco leaves are stripped off with a downward stripping action by the rods 28, the leaves naturally react upwardly against the rods 28. The rigid stripper rods 28 resist this upward reaction, through their sliding engagement with the bars 14. The rods 28 might otherwise be displaced upwardly by the leaves, since they are bodily carried by the flexible belts 27.

Although I have described the machine as having certain preferred dimensions, it should be understood that these are merely illustrative of a preferred embodiment of the invention, and should not be construed in a limiting sense, since they may all be varied somewhat when desired.

It is to be understood that the form of the invention herewith shown and described, is to be taken as a preferred example of the same, and that various changes in the shape, size and arrangement of parts may be resorted to, without departing from the spirit of the invention or scope of the subjoined claims.

Having thus described my invention, I claim:

1. A tobacco harvester comprising a support to travel longitudinally of a row of tobacco plants, a pair of spaced inclined bars carried by the support and extending longitudinally of the row and having their uppermost ends directed forwardly, the bars receiving the tobacco plants in the row between them and stripping from the tobacco plants with a downward stripping action the tobacco leaves which are arranged generally transversely of said spaced bars, and a plurality of longitudinally spaced elements carried by the support and extending transversely of the spaced bars and movable longitudinally of the bars in response to engagement with the tobacco plants, said elements stripping from the plants with a downward stripping movement the leaves which are arranged generally longitudinally of the spaced bars.

2. A tobacco harvester comprising a wheeled support to be drawn along a row of tobacco plants, a pair of spaced inclined bars mounted upon the support and extending longitudinally of the row and having their uppermost ends directed forwardly, the spaced bars receiving the tobacco plants in the row between them and stripping from the plants the tobacco leaves disposed generally transversely of the spaced bars as the harvester travels forwardly, and a plurality of longitudinally spaced rods connected with the support and extending transversely of the spaced bars and arranged close to the bottoms of the bars, the rods moving longitudinally rearwardly of the spaced bars in response to engagement with the tobacco plants and stripping from the tobacco plants the leaves which extend generally longitudinally of the spaced bars.

3. In a tobacco harvester, a pair of spaced substantially parallel inclined bars to be moved longitudinally of a row of tobacco plants and having their uppermost ends directed forwardly and adapted to receive the tobacco plants between them, the inclined bars stripping from the tobacco plants tobacco leaves which extend generally transversely of the bars with a downward stripping action as the harvester moves forwardly, and elements connected with the inclined bars and extending transversely thereof and movable longitudinally rearwardly of the inclined bars when engaged by the tobacco plants, said elements stripping from the tobacco plants the leaves which extend generally longitudinally of said inclined bars.

4. In a tobacco harvester, a pair of spaced substantially parallel inclined bars to travel longitudinally of a row of tobacco plants and adapted to receive the plants of the row between them and having their uppermost ends directed forwardly, the bars stripping from the tobacco plants the tobacco leaves which grow generally transversely of the bars, and a plurality of transverse rods connected with the bars in longitudinally spaced relation and movable longitudinally rearwardly along the bars when engaged by the tobacco plants, the rods substantially contacting the bottoms of the bars and serving to strip from the tobacco plants the leaves which grow generally longitudinally of the bars.

5. In a tobacco harvester, a pair of spaced substantially parallel inclined stripper bars to be moved longitudinally of a row of tobacco plants and adapted to receive between them the tobacco plants and having their uppermost ends forwardly directed, a pair of pulleys connected with the harvester and spaced longitudinally of the inclined stripper bars, an endless flexible element engaging the pulleys, and stripper rods secured to the endless flexible element and adapted to extend transversely of the stripper bars and to move longitudinally rearwardly along the stripper bars when engaged by the tobacco plants, the stripper rods being arranged close to the bottoms of the stripper bars and serving to strip from the tobacco plants the leaves which have grown generally longitudinally of the row, the inclined stripper bars stripping from the tobacco plants the leaves which have grown generally transversely of the row.

6. A tobacco harvester comprising a front axle having wheels mounted thereon and including an elevated portion to pass over the tops of tobacco plants, a pair of spaced substantially parallel inclined stripper bars having their forward elevated ends secured to the elevated axle portion and adapted to receive between them tobacco plants, rear axle sections secured to the lowermost rear ends of the stripper bars and having wheels mounted thereon, pulleys connected with the stripper bars and spaced longitudinally thereof, an endless flexible element mounted upon the pulleys to drive the same, rods secured to the endless flexible element at longitudinally spaced intervals and extending transversely of the stripper bars and substantially contacting the bottoms of the stripper bars and adapted to move longitudinally of the stripper bars with the endless flexible element when engaged by a tobacco plant, the stripper bars stripping from the tobacco plant the leaves which have grown generally transversely of the stripper bars while the rods strip from the plant the leaves which have grown longitudinally of the stripper bars.

7. A tobacco harvester comprising a wheeled support to travel longitudinally of a row of tobacco plants, a pair of spaced substantially parallel inclined bars carried by the support and having their upper ends directed forwardly and adapted to receive between them the tobacco plants of the row and stripping from the plants the tobacco leaves which are extending generally transversely of the spaced bars, a forward stripper unit connected with one of said spaced bars and including spaced elements which extend transversely of the bars adjacent to the lower sides of the same and movable longitudinally rearwardly of the bars when engaged by tobacco plants, the elements stripping from the tobacco plants the leaves which extend generally longitudinally of the spaced bars, and a rear stripper unit connected with the other of said spaced bars and including spaced elements which extend transversely of the spaced bars adjacent to the lower sides of the same and being movable longitudinally rearwardly of the bars when engaged by tobacco plants and also serving to strip from the plants leaves which extend substantially longitudinally of the spaced bars.

JACK R. COX.

No references cited.